United States Patent Office 3,452,813
Patented July 1, 1969

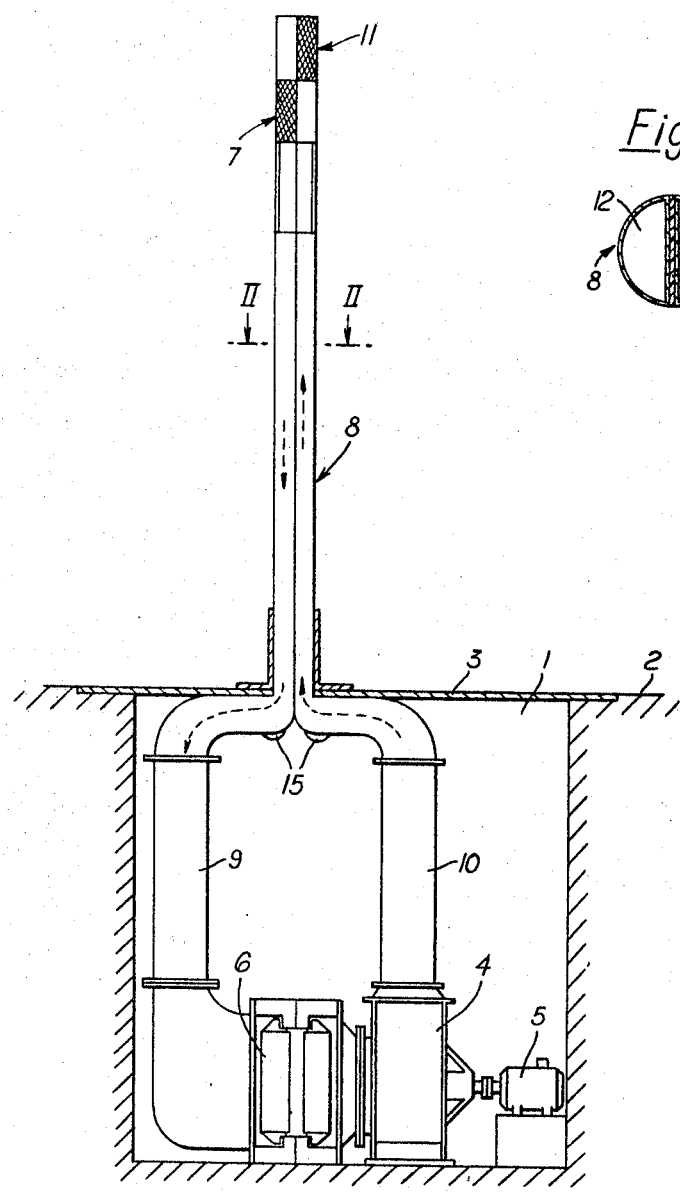
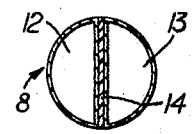

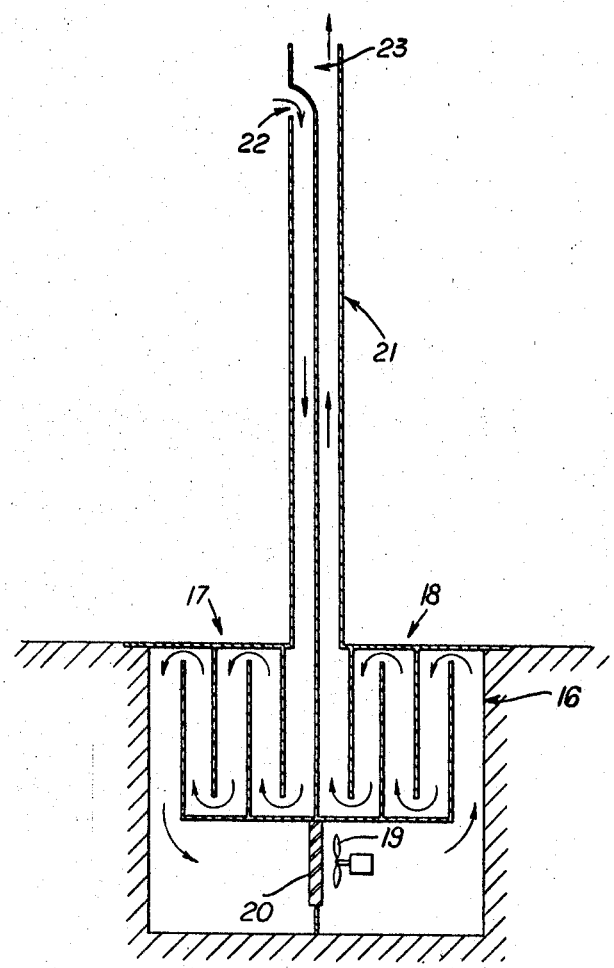

3,452,813
ELECTRIC CABLE INSTALLATIONS
Roland Howard Weir Watkins, Beaconsfield, Montreal, Quebec, Canada, and Henry John Williamson, Gravesend, Kent, England, assignors to British Insulated Callender's Cables Limited, London, England
Filed July 27, 1967, Ser. No. 656,546
Claims priority, application Great Britain, July 29, 1966, 34,229/66
Int. Cl. F28f 1/02, 27/02; F24h 7/06
U.S. Cl. 165—120                    10 Claims

ABSTRACT OF THE DISCLOSURE

A part or parts of an electric cable installation, i.e., joints or cable lengths, are cooled by a circulating primary cooling fluid which is itself cooled in a plurality of separate heat exchangers. The primary fluid circuit of each heat exchanger is located in a separate underground chamber which also contains an airimpeller and at least one attenuator for the moving air. The cool air enters the chamber and the hot air leaves the chamber through a single or composite stack erected above ground level.

---

This invention relates to electric cable installations provided with means for cooling a cable or cables of the installation along a part or parts of or the whole of the length of the cable or cables. More particularly the invention relates to such an installation in which the cable is cooled by the circulation of a cooling fluid (hereinafter referred to as the primary cooling fluid) through at least one cable length and/or cable joint enclosure or through a duct lying adjacent to at least one cable length and/or joint, the cooling fluid itself being cooled by passage through a heat exchanger or exchangers in which it is cooled by a circulating secondary cooling fluid.

A large proportion of the cable installations that require such forced cooling are installed in built-up areas where space for large heat exchanger installations is not available and where large installations would be detrimental to the amenities of the occupants of the built-up area. One solution to this problem proposed in U.S. application Ser. No. 487,126, now Patent No. 3,363,046, granted Jan. 9, 1968 is to distribute an elongated heat exchanger along substantially the whole of the cable route; the object of the present invention is to provide a heat exchanger system that can be readily adapted to suit the locality through which the installation passes and installed in such a way as to produce no or very little disturbance to the inhabitants of the built-up area.

Cable installations in accordance with the present invention incorporate a number of heat exchanger units each comprising: a chamber located wholly or substantially wholly below ground level and containing a primary circuit for the primary cooling fluid, means for impelling air from the atmosphere into heat-exchange relationship with the primary fluid, and at least one attenuator for the circulating air; and an inlet for cool air from the atmosphere and an outlet for the heated air both extending upwards from the chamber in the form of a single or composite stack erected above ground level.

Various forms of heat exchanger unit for use in cable installations in accordance with the invention and the manner in which they can be incorporated in such installations will now be described by way of example with reference to the accompanying drawings in which:

FIGURE 1 is an elevation partly in vertical section of one form of heat exchanger unit, FIGURE 2 is a cross-section on line II—II in FIGURE 1, FIGURE 3 is a diagrammatical elevation of another form of heat exchanger unit.

Figure 4:
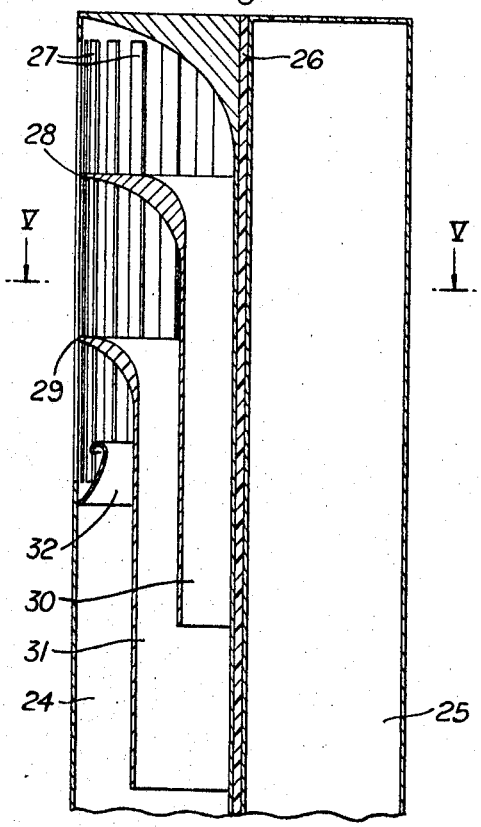
FIGURE 4 is a sectional elevation of the upper part of the stack of a heat exchanger unit.

Referring to FIGURE 1, a chamber 1 below the ground surface 2 and provided with a cover plate 3 contains a centrifugal fan 4, driven by an electric motor 5, which draws air through a heat exchanger 6. The air is drawn from the atmosphere through an inlet grill 7 in a vertical stack 8 and passes through an attenuator 9 before being drawn through the heat exchanger 6. In the heat exchanger 6 the air passes over the surface of a number of ducts through which a primary cooling fluid is circulated and extracts heat from the primary fluid. From the fan 4, the heated air passes through a second attenuator 10 into the stack 8 and leaves the stack through an outlet grill 11. The function of the attenuators 9 and 10 is to prevent a disturbing level of fan noise from being emitted through the inlet and outlet grills.

As can be seen from FIGURE 2, the stack is a composite tube of circular cross-section comprising throughout its length inlet and outlet ducts 12 and 13 of semicircular cross-section provided at their upper ends with inlet and outlet orifices respectively and separated by a layer of thermal insulation 14. The air inlet orifice is in the upper part of a side wall of the stack and the outlet orifice in the top of the stack. Moisture condensing in these ducts is removed through moisture traps 15 (FIGURE 1). The stack extends to a sufficient height above ground level to avoid disturbance to passers by and residents caused by the circulating air and/or any vapour that may be emitted from the outlet vent.

The heat exchanger unit shown diagrammatically in FIGURE 3 differs from that shown in FIGURES 1 and 2 in that the walls of the chamber 16 serve as boundary walls for parts of the attenuators 17 and 18 and for a subsidiary chamber housing a fan 19 and heat exchanger 20, thus enabling an underground chamber of smaller overall dimensions to be used. The attenuators 17 and 18 are formed by mounting baffles in the chamber to lead the air in a sinuous path from the air inlet to the fan and from the fan to the air outlet. Thus the attenuators occupy substantially the whole of the upper part of the chamber leaving the lower part free for the fan and the heat exchange ducts for the primary fluid. The stack 21 is similar to the stack 8 of FIGURES 1 and 2 except that it has a side inlet 22 and a vertical outlet 23.

Figure 5:
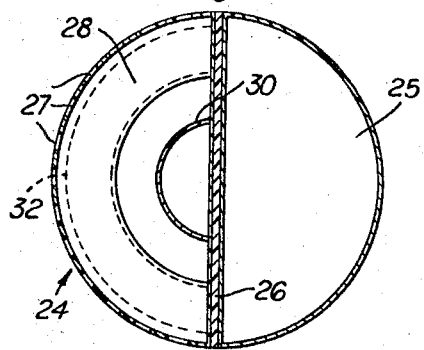
FIGURE 5 is a section on lines V—V in FIGURE 4, and FIGURES 6, 7 and 8 are diagrammatic representations of parts of cable installations.

FIGURES 4 and 5 show the upper end of an alternative form of stack comprising two ducts, an inlet duct 24 and an outlet duct 25 each of semicircular cross-section, separated by thermal insulation 26. The air enters the inlet duct 24, through slots 27, in three streams separated by horizontal baffles 28 and 29 and vertical semicircular baffles 30 and 31, designed to give with the assistance of a deflector 32, a nonturbulent flow into the duct. Air passes unimpeded from the outlet duct 25 through a grill vertically into the atmosphere. The three entry passages for the air are made of substantially equal hydraulic resistance by making the baffle 30 of the external radius of 1.78", the baffle 31 of external radius 3.00", and the duct 24 of internal radius 4.20".

The primary fluid flowing through the heat exchangers may be any fluid used for cooling cable lengths and/or joints of an electric cable installation, whether circulating under convection or circulated by pumps.

Examples of installations in which the heat exchanger units can be used are as follows:

EXAMPLE 1

Figure 6:
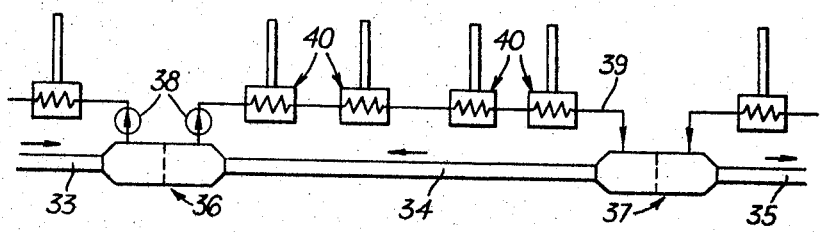

An installation in which at least four heat exchangers for a cooled cable length, or for a number of cooled cable lengths laid side by side, are arranged at intervals along a return pipe with their primary fluid circuits in series with or forming part of the return pipe. A diagrammatic representation of the installation forms FIGURE 6 of the drawings, which shows three cooled lengths 33, 34, 35 of a single core oil-filled cable interconnected by stop joints 36, 37, through which oil in the hollow conductors of the cable is circulated in the direction of the arrows by pumps such as 38. The oil passing through the cable length 34 circulates also through a return pipe 39 in which the primary fluid circuits of four of the heat exchanger units 40 are connected in series.

EXAMPLE 2

Figure 7:
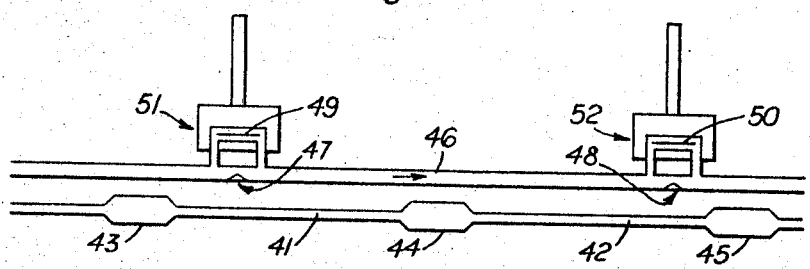

An installation in which a cable or a number of cables laid side by side is or are cooled by water passing through a pipe or pipes buried alongside the cable or cables. In such an installation water from the pipe or pipes can be caused to flow, at intervals along the route, through the primary fluid circuits of the heat exchanger units. In FIGURE 7 the cable lengths 41, 42 are joined at 43, 44, 45 and the cable is cooled by water flowing through a pipe 46 buried in the same trench as the cable. At convenient intervals along the water pipe 46 part of the water flow is diverted by partial barriers 47, 48 and caused to flow through heat exchangers 49 and 50 forming part of heat exchanger units 51, 52 of the kind described with reference to FIGURES 1 to 5. The heat exchanger units are located at selected points along the route where space is available and where they will cause the minimum nuisance.

EXAMPLE 3

An installation in which some or all of the cable joints are cooled by fluid flowing through the joint enclosure and a heat exchanger, either under convection or under the action of a pump or pumps. In such an installation said fluid is the primary cooling fluid and it is caused to flow through heat exchanger units such as those described with reference to FIGURES 1 to 5 of the drawings. Installations of this kind are the subject of U.S. patent application Ser. No. 534,466, now abandoned.

Figure 8:
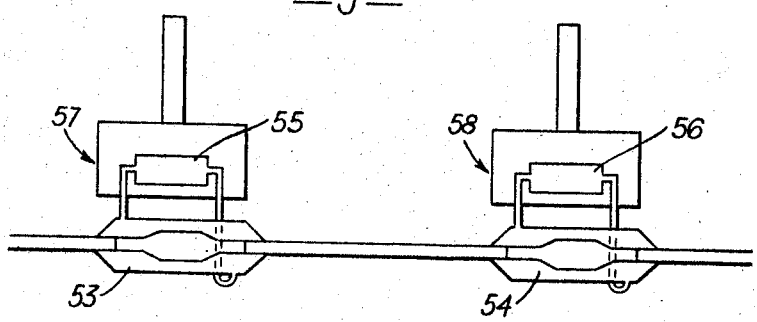

Referring to FIGURE 8, oil from joint enclosures 53, 54 circulates under convection through the heat exchangers 55, 56 of two heat exchanger units 57 and 58 as described with reference to FIGURES 1 to 5.

In the examples of heat exchanger unit described, the air inlet has been shown in the upper part of the stack adjacent to the air outlet but it may be possible in some circumstances to arrange for the inlet to be much lower than the outlet, that is to say in the lower part of the stack.

Although in the interest of causing the least obstruction, it is desirable to make the stack of minimum cross-sectional dimensions, it may in some circumstances be possible to effect some attenuation of the fan noise within the stack by means of suitably shaped baffles or grids.

What we claim as our invention is:

1. In an electric cable installation at least part of which is cooled by the circulation of a primary cooling fluid and the primary fluid is cooled by passage through at least one heat exchanger, the use of a plurality of heat exchanger units each comprising:
    (a) a chamber located wholly or substantially wholly below ground level and containing:
        (i) a primary circuit for the primary cooling fluid,
        (ii) means for impelling air from the atmosphere into heat-exchange relationship with the primary fluid, and
        (iii) at least one attenuator for the circulating air; and
    (b) an inlet for cool air from the atmosphere and an outlet for the heated air both extending upwards from the chamber in the form of a stack erected above ground level.

2. An installation as claimed in claim 1 in which the chamber of each heat exchanger unit contains means for impelling air from the atmosphere through a first attenuator located in the chamber into heat-exchange relationship with the primary fluid and then through a second attenuator located in the chamber into the atmosphere.

3. An installation as claimed in claim 2 in which said first and second attenuators are formed by mounting baffles in the chamber to direct the air entering the chamber through a sinuous path towards the air impelling means and through a sinuous path from the impelling means to said outlet.

4. An installation as claimed in claim 2 in which the first and second attenuators occupy substantially the whole of an upper part of the chamber and the air impelling means and heat exchange ducts for the primary cooling fluid are located in a lower part of the chamber.

5. An installation as claimed in claim 3 in which the first and second attenuators occupy substantially the whole of an upper part of the chamber and the air impelling means and heat exchange ducts for the primary cooling fluid are located in a lower part of the chamber.

6. In an electric cable installation at least part of which is cooled by the circulation of a primary cooling fluid and the primary fluid is cooled by passage through at least one heat exchanger unit, the use of a plurality of heat exchanger units each comprising:
    (a) a chamber located wholly or substantially wholly below ground level and containing:
        (i) a primary circuit for the primary cooling fluid,
        (ii) means for impelling ar from the atmosphere into heat-exchange relationship with the primary fluid, and
        (iii) at least one attenuator for the circulating air; and
    (b) a composite tubular stack, extending upwards from the chamber, erected above ground level and comprising:
        (iv) an air inlet duct provided at its upper end with an inlet for cool air from the atmosphere, and
        (v) an air outlet duct for the heated air provided at its upper end with an outlet orifice open to the atmosphere at the upper end of the stack.

7. An installation as claimed in claim 6 in which the inlet and outlet ducts are each in the form of a tube and are separated from each other by thermal insulation.

8. An installation as claimed in claim 6 in which the stack is of substantially circular cross-section and the inlet and outlet ducts are of substantially semi-circular cross-section.

9. An installation as claimed in claim 6 in which the air inlet orifice is in a side wall of the stack and the outlet orifice is in the top of the stack.

10. An installation as claimed in claim 6 in which the part of the inlet duct adjacent the inlet orifice is divided by baffles into a number of separate air passages.

References Cited

UNITED STATES PATENTS

| | | | |
|---|---|---|---|
| 1,754,314 | 4/1930 | Gay | 174—15 |
| 2,066,321 | 1/1937 | Bennett | 174—15 |
| 2,066,322 | 1/1937 | Bennett | 174—15 |
| 2,932,682 | 4/1960 | Barass | 174—15 |
| 3,074,477 | 1/1963 | Whalen | 165—122 |

ROBERT A. O'LEARY, Primary Examiner.

T. W. STREULE, Assistant Examiner.

U.S. Cl. X.R.

165—45; 174—45